United States Patent
Kang (10) Patent No.: US 7,433,873 B2
(45) Date of Patent: Oct. 7, 2008

(54) WEB SERVICE-ENABLING DIGITAL VIDEO/AUDIO-PROCESSING APPARATUS, AND WEB SERVICE METHOD AND SYSTEM THEREFOR

(75) Inventor: Duk-jin Kang, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 364 days.

(21) Appl. No.: 11/212,572

(22) Filed: Aug. 29, 2005

(65) Prior Publication Data

US 2006/0047668 A1    Mar. 2, 2006

(30) Foreign Application Priority Data

Aug. 30, 2004    (KR)    ............... 10-2004-0068689

(51) Int. Cl.
*G06F 17/30*    (2006.01)
(52) U.S. Cl. ............................................. 707/10
(58) Field of Classification Search ............ 707/2, 707/10, 104.1; 725/46; 709/218, 224
See application file for complete search history.

(56) References Cited

U.S. PATENT DOCUMENTS

| 7,069,293 | B2 * | 6/2006 | Cox et al. ............... 709/203 |
|---|---|---|---|
| 2002/0083153 | A1 * | 6/2002 | Sweatt et al. ............. 709/218 |
| 2003/0229900 | A1 * | 12/2003 | Reisman .................. 725/87 |
| 2004/0123318 | A1 * | 6/2004 | Lee et al. ................. 725/46 |

FOREIGN PATENT DOCUMENTS

| JP | 2002-118805 A | 4/2002 |
|---|---|---|
| JP | 2002-118815 A | 4/2002 |
| JP | 2002-208899 A | 7/2002 |
| KR | 20020026746 A | 4/2002 |
| KR | 2002-0075377 A | 10/2002 |
| KR | 10-2004-0017567 A | 2/2004 |
| KR | 10-2004-0072021 A | 8/2004 |

* cited by examiner

*Primary Examiner*—Etienne P LeRoux
(74) *Attorney, Agent, or Firm*—Sughrue Mion, PLLC (57) ABSTRACT

A web service-enabling digital video/audio-processing apparatus, and web service method and system therefor are provided. A first communication module receives a web service address from an external device to carry out a certain function; a web service engine checks whether a file contained in the received web service address exists in a function list, and outputs the web service address to a first engine unit if the file exists. The first engine unit parses the web service address and generates a web language corresponding to the function; a function setting unit sets the function based on the web language; and a control unit performs the set function.

22 Claims, 8 Drawing Sheets

WEB SERVICE-ENABLING DIGITAL VIDEO/AUDIO-PROCESSING APPARATUS, AND WEB SERVICE METHOD AND SYSTEM THEREFOR

CROSS-REFERENCE TO RELATED APPLICATIONS

This application claims priority from Korean Patent Application No. 10-2004-0068689, filed on Aug. 30, 2004, the entire content of which is incorporated herein by reference.

BACKGROUND OF THE INVENTION

1. Field of the Invention

Apparatuses, methods and systems consistent with the present invention relate to web service-enabling digital video/audio-processing, and more particularly, to web service-enabling digital video/audio-processing which performs tasks requested by a web service requester.

2. Description of the Related Art

Digital TVs receive and display digital contents transmitted from broadcast stations, and the digital contents contain a digital audio/video signal and Electronic Program Guide (EPG) information.

Such TVs provide diverse functions such as program reservation, program reservation cancellation, program information searches, and so on, by using the EPG information. Further, the TVs provide time-on and time-off functions, respectively, turning themselves on and off at desired times.

However, the above functions of the conventional TVs are set when a user directly carries out setting jobs with the TVs, by using a remote controller. That is, the above functions can not be set, changed, and so on, at the places where the TVs are not located. Thus, it is difficult r impossible to turn on the TV at a scheduled time when a user is not at home.

Furthermore, a conventional TV has a drawback as it can not display images recorded on external recording media without a Universal Serial Bus (USB), smart card interface, or the like, installed therein.

SUMMARY OF THE INVENTION

An aspect of the present invention is to provide a web service-enabling digital video/audio-processing apparatus, web service method and system, capable of providing web services, through which users can change and perform the functions of the TVs by connecting to the TVs located at a different location than where the user is located. For example, when the TV is at home and the user is not at home.

Another aspect of the present invention, is to provide a web service-enabling digital video/audio-processing apparatus, and web service method and system, capable of providing web services by using the Simple Object Access Protocol (SOAP) and Universal Discovery Description and Integration (UDDI).

The foregoing and other aspects are realized with a web service-enabling digital video/audio-processing apparatus, which includes a first communication module for receiving a web service address from an external device to carry out a certain function; a web service engine for checking whether a file contained in the received web service address exists in a function list, and for outputting the web service address if the file exists; a first engine unit for parsing the outputted web service address and generating a web language corresponding to the function; a function setting unit for setting the function based on the generated web language; and a control unit for performing the set function.

The web service engine analyzes the generated web language and decides the function that the function setting unit is to set, and notifies the function setting unit of the decided function. The function setting unit sets the notified function.

Further, the control unit carries out at least one of the EPG functions of program reservation, program reservation cancellation, a time-on function of power-on at fixed times, and a time-off function of power-off at fixed times, by using EPG information.

If the function decided by the web service engine is decided for re-setting at least one EPG function, the function setting unit re-sets the EPG function to the function, and the control unit performs the re-set function.

The external device includes a web service requester for generating a view enabling a user to select the function, and generating the web service address corresponding to the selected function to request a web service; a display unit for displaying the generated view; a user input unit for selecting the function from the generated view; a second engine unit for generating, in a predetermined protocol format, the web service address corresponding to the selected function, if the web service is requested; and a second communication module for sending the generated web service address to the first communication module.

In an exemplary embodiment, the predetermined protocol is SOAP, and the first and second engine units are a SOAP engine, and the web language generated from the first engine unit is eXtensible Markup Language (XML).

In a further exemplary embodiment, the apparatus further comprises a storage unit for storing data, wherein, if the function decided by the web service engine is decided for sending data stored in the storage unit, the function setting unit reads the data stored in the storage unit and outputs the data to the web service engine, the web service engine generates the XML containing the outputted data, the first SOAP engine converts the generated XML into the SOAP format, and the first communication module sends the SOAP-formatted data to the external device.

If the file is decided not to exist, the web service engine generates and sends an error message to the external device through the communication module.

The foregoing and other aspects are further realized by providing a web service method, which includes the operations of receiving a web service address from an external device to carry out a certain function; checking, by a web service engine, whether a file contained in the received web service address exists in a function list; parsing the web service address and generating a web language corresponding to the function, and if the file exists; analyzing the generated web language to decide the function; and setting and performing the decided function.

The decided function is at least one of an EPG function of program reservation, program reservation cancellation, a time-on function of power-on at fixed times, and a time-off function of power-off at fixed times by using EPG information.

The method, before the operation of receiving the web service address, further comprises the operations of displaying a view for selecting the function; selecting the function on the generated view to request a web service; converting into a predetermined protocol format the web service address corresponding to the selected function; and sending by the external device the generated web service address.

In an exemplary embodiment, the predetermined protocol is SOAP, the operation of the conversion into the predetermined protocol format is executed by the SOAP engine, and the generated web language is XML.

Further, the method further includes an operation where, if the decided function is to request for sending stored data, sending to the external device the data corresponding to the web service address by using the SOAP.

Further, in another exemplary embodiment, if the file is decided not to exist, the web service engine generates and sends an error message to the external device.

The foregoing and other objects and advantages are realized by providing a web service-enabling digital video/audio-processing apparatus, comprising a storage unit for storing data for providing a certain web service; a registration request unit for generating a registration request message for registering a list of web services in a UDDI server; a first SOAP engine for converting the registration request message into a SOAP format, and parsing a web service address received from the web service requester; a first UDDI module for converting the SOAP-formatted registration request message into UDDI standards; a first communication module for sending to the UDDI server the registration request message of UDDI standards, and receiving the web service address from the web service requester; and a first web service engine for reading from storage unit data corresponding to the received web service address, and for converting the data into a XML format, based on a result obtained from parsing the received web service address, wherein the first SOAP engine converts the XML-formatted data into the SOAP format, and the first communication module sends the SOAP-formatted data to the web service requester.

In an exemplary embodiment, the web service requester includes a search request unit for generating a search request message for requesting the UDDI server to search for a certain web service; a second SOAP engine for converting the search request message into the SOAP format; a second UDDI module for converting the SOAP-formatted search request message into the UDDI standards; a second communication module for sending to the UDDI server the registration request message of UDDI standards, and for receiving an address of a web service provider from the UDDI server; and a web service request unit for generating the web service address and requesting the web service based on the received address of the web service provider, wherein the second SOAP engine converts the generated web service address into the SOAP format, and the second communication module sends the SOAP-formatted web service address to the web service provider to request the web service.

In another exemplary embodiment, the UDDI server includes a UDDI interface unit for receiving a SOAP-formatted registration request message of UDDI standards and a SOAP-formatted search request message of UDDI standards; a UDDI registry for registering the web service based on the SOAP-formatted registration request message; and a UDDI engine for analyzing the received registration request message to register the web service in the UDDI registry, analyzing the received search request message to check whether the web service is registered, and sending to the web service requester the address of the web service provider providing the web service if registered.

The web service requester may be one of a personal computer or a digital broadcast processing device, but is not limited to either of these devices.

The foregoing and other objects and advantages are further realized by providing a web service method for a digital video/audio-processing apparatus receiving a broadcast signal, which includes the operations of registering in a UDDI server a web service to be provided; receiving from a web service requester a web service address corresponding to the web service registered in the UDDI server; checking by a web service engine whether a file contained in the received web service address exists in a function list; parsing the web service address, if the file exists; reading data corresponding to the received web service address and converting the data into an XML format based on a parsing result; and converting the XML-formatted data into a SOAP format and sending the SOAP-formatted data to the web service requester.

In an exemplary embodiment, the registration operation includes the further operations of generating a registration request message for registering the web service in the UDDI server; converting the registration request message into a SOAP format; converting the SOAP-formatted registration request message into UDDI standards that the UDDI server can recognize; and sending the registration request message of UDDI standards to the UDDI server.

The foregoing and other objects and advantages are realized by providing a web service system, comprising a digital TV for providing web services; a web service requester for requesting search for a certain web service by using SOAP; and a UDDI server for checking whether the web service is registered, if the web service is searched from the web service requester, and sending to the web service requester an address of a web service provider providing the web service by using the SOAP, wherein the web service requester requests the web service to the web service provider based on the address of the web service provider, and the web service provider provides the requested web service to the web service requester.

In an exemplary embodiment, at least one of the web service provider and the web service requester may be a TV.

BRIEF DESCRIPTION OF THE DRAWINGS

The above and other aspects of the present invention will become more apparent by describing certain exemplary embodiments of the present invention with reference to the accompanying drawings, in which.

DETAILED DESCRIPTION OF EXEMPLARY EMBODIMENTS

Hereinafter, the present invention will be described in detail with reference to the accompanying drawings.

Figure 1:
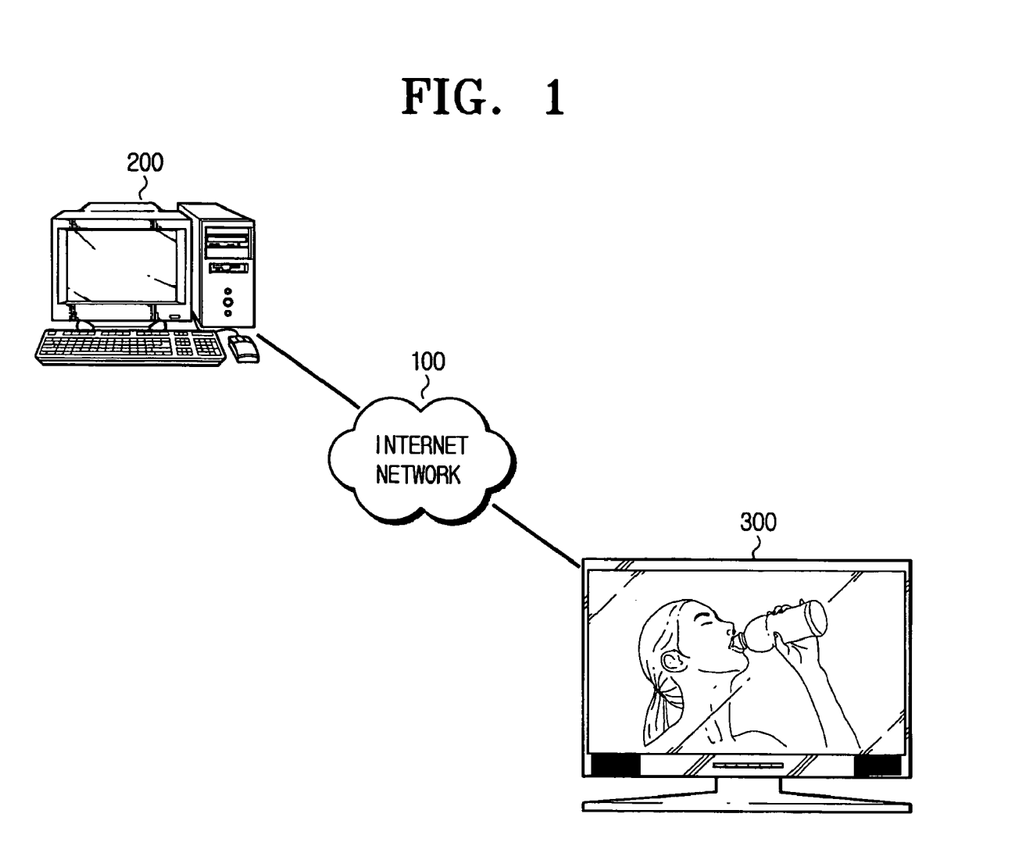
FIG. 1 is a view for showing external devices connected to a web service-enabling digital video/audio-processing apparatus capable of providing web services according to an exemplary embodiment of the present invention.

FIG. 1 is a view for showing a web service-enabling digital video/audio-processing apparatus and external devices connected thereto according to an exemplary embodiment of the present invention.

In FIG. 1, a web service-enabling digital video/audio-processing apparatus 300 is connected, for communications, to an external device 200 such as a computer or a TV through the Internet network 100. The external device 200 requests a web service by using the SOAP, and the digital video/audio-processing apparatus 300 provides the web service requested by the external device 200 by using the SOAP.

The SOAP is an XML-based protocol intended for exchanging structured information and inputted information in the web, and a user can use diverse and automated web services based on an open and shared web infrastructure.

Figure 2:
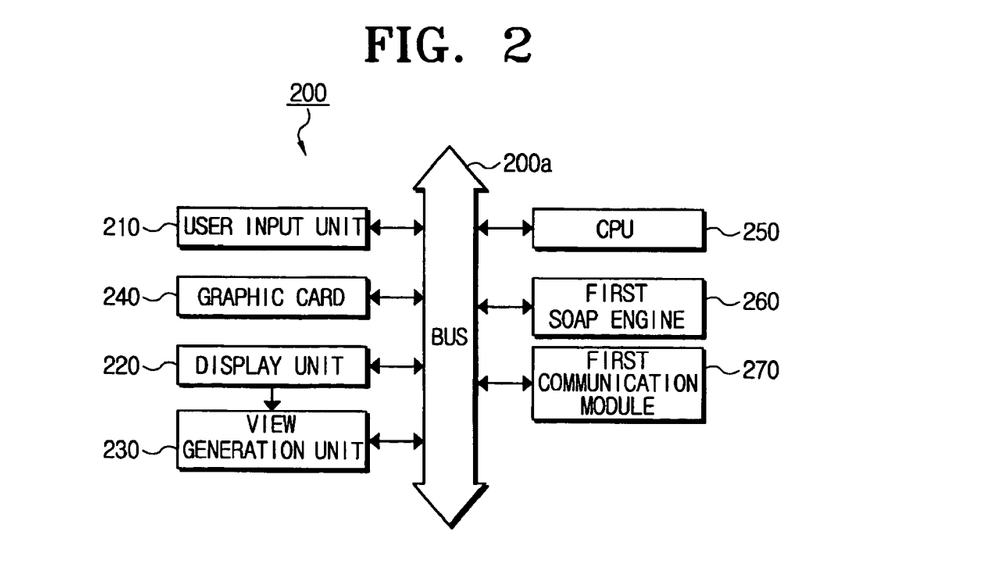
FIG. 2 is a block diagram for showing in detail the external device of FIG. 1.

FIG. 2 is a block diagram for showing in more detail an external device of FIG. 1.

In FIG. 2, the external device 200 includes a user input unit 210, a graphic card 240, a display unit 220, a view generation unit 230, a central processing unit (CPU) 250, a first SOAP engine 260, and a first communication module 270. A bus 200a provides data paths between the above individual units. FIG. 2 shows a computer, but only the components related to the present invention.

The user input unit 210 is a user interface for operating the external device 200, and may be a keyboard, mouse, buttons, touch panel, or the like. The user input unit 210 outputs a signal requesting the view of a web browser such as 'Explorer' and the control view capable of controlling the functions of the digital video/audio-processing apparatus 300. Further, the user input unit 210 enables a user to select a certain function on a displayed view and request web service.

The graphic card 240 processes a video signal into a displayable signal and outputs the signal to the display unit 220. In the present invention, the graphic card 240 signal-processes the web browser view or the control view that is generated by the view generation unit 230, and outputs the view to the display unit 220.

The display unit 220 displays the view generated by the view generation unit 230. The display unit 220, as above, can be a cathode ray tube (CRT), liquid crystal display (LCD), and so on.

The view generation unit 230 generates a view enabling a user to select a desired one of plural functions provided by the digital video/audio-processing apparatus 300. Further, the view generation unit 230 generates a web service address corresponding to the selected function. The web service address is a uniform resource locator (URL) corresponding to a function selected from the web browser view.

If the view generation unit 230 generates a web browser view according to a view display request from the user input unit 210, the display unit 220 displays a web browser view. If the IP of the digital video/audio-processing apparatus 300 is inputted on an address window of the web browser view through the user input unit 210, the external device 200 is connected to the digital video/audio-processing apparatus 300, and then the view generation unit 230 generates a view displaying functions provided by the digital video/audio-processing apparatus 300.

Further, the view generation unit 230 generates a control view through an application program capable of controlling the web browser as well as the digital video/audio-processing apparatus 300, and can generate the above web service address based on the selected function. In such a case, the view generation unit 230 performs the above operations based on the application program generating the control view.

If a desired function, of a plurality of functions, is selected through the user input unit 210 and an argument of the selected function is established, the view generation unit 230 generates a web service address containing the IP of the digital video/audio-processing apparatus 300, selected function, and the argument of the selected function. In an exemplary embodiment, the selected functions are files which have an extension of 'asmx'.

For example, if a user selects a function relating to the EPG in the web browser view showing statuses of the digital video/audio-processing apparatus 300, and sets, through the user input unit 210, an argument of instructing the digital video/audio-processing apparatus 300 to be turned on at 8 a.m., the view generation unit 240 generates a web service address as follows:

http://111.111.111.111/1.asmx/fun-list&Bun&- arg=3 wherein, '111.111.111.111' indicates an IP of the digital video/audio-processing apparatus 300, '1.asmx' is a file providing an EPG function, and '1.asmx/fun-list&Bun&-arg=3' is an argument of a selected function.

The CPU 250 controls the overall operations of the external device 200 by using various control programs that have been stored.

The first SOAP engine 260 creates, in the form of SOAP, a web service address corresponding to a selected function.

The first communication module 270 transfers the web service address in the SOAP form, to the digital video/audio-processing apparatus 300 through the Internet network 100.

Figure 3:
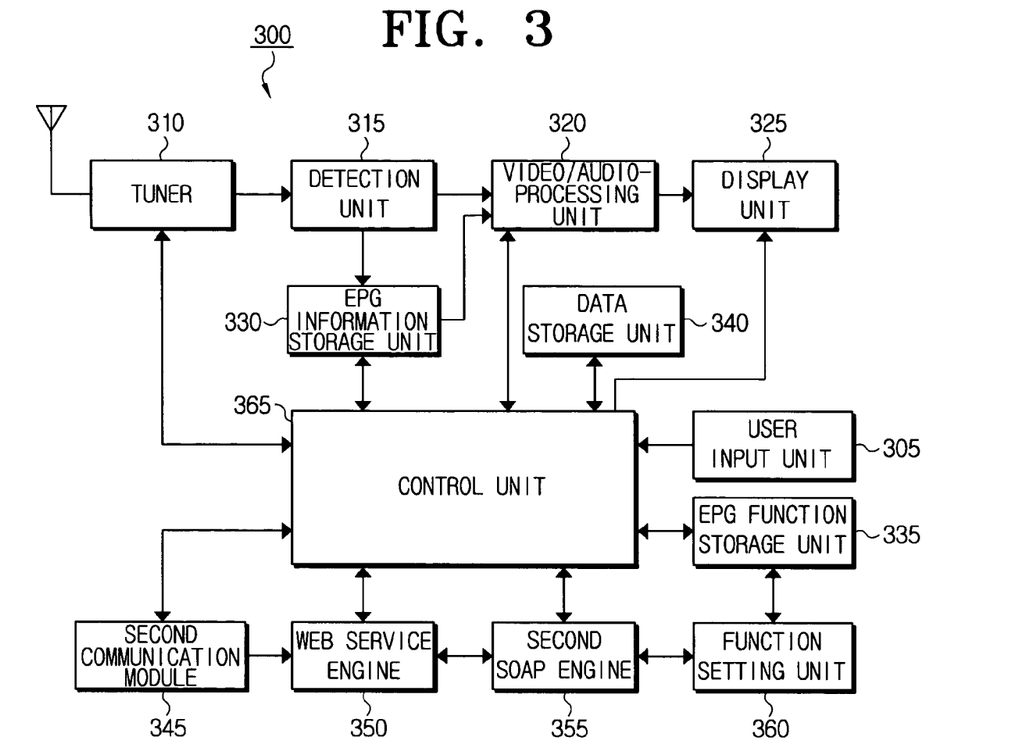
FIG. 3 is a block diagram for showing the web service-enabling digital video/audio-processing apparatus of FIG. 1 according to an exemplary embodiment of the present invention.

FIG. 3 is a block diagram for showing the web service-enabling digital video/audio-processing apparatus according to an exemplary embodiment of the present invention.

In FIG. 1 to FIG. 3, the digital video/audio-processing apparatus 300 has a user input unit 305, a tuner 310, a detection unit 315, a video/audio-processing unit 320, a display unit 325, an EPG information storage unit 330, an EPG function storage unit 335, a data storage unit 340, a second communication module 345, a web service engine 350, a second SOAP engine 355, a function setting unit 360, and a control unit 365.

The web service-enabling digital video/audio-processing apparatus 300 receives EPG information and a broadcast signal transmitted from a transmitter (not shown). The web service-enabling digital video/audio-processing apparatus 300 provides web services by using the received EPG information. The EPG information is broadcast program guide information related to broadcast signals.

The user input unit 305 is a viewer interface used to generate to the control unit 365, commands for performing functions supported by the digital video/audio-processing apparatus 300. To do this, the user input unit 305 is provided with function keys (not shown) containing a plurality of numeral keys, i.e. an Enter key, and so on.

The tuner 310 tunes to a predetermined channel selected by a viewer out of a plurality of channels received through an antenna. The tuned channel contains a broadcast signal and EPG information.

The detection unit 315 detects the EPG information from the tuned channel, and outputs the detected EPG information to the EPG information storage unit 330, and the broadcast signal, except the detected EPG information, is outputted to the video/audio-processing unit 320. The EPG information is codified to be sent, by using a particular region of a video signal packet for a digital broadcast signal, so the EPG information can be obtained by detecting and decoding the particular region.

The video/audio-processing unit 320 decodes a video signal of the outputted broadcast signal and generates displayable image data, and decodes the audio signal of the outputted broadcast signal and generates an audible audio data. The generated video data is displayed on the display unit 325, and the audio data is externally outputted through speakers (not shown).

Further, if a user requests to display an EPG view, via the user input unit 305, the video/audio-processing unit 320 generates the EPG view by using the EPG information. Furthermore, the video/audio-processing unit 320 overlaps the EPG view with a video signal currently displayed for an output to the display unit 325. The EPG view is a graphic user interface (GUI) window containing programs by times and channels that are provided from a plurality of broadcast stations.

The user can use the EPG information and view to set a variety of EPG functions such as program reservation, program reservation cancellation, time-on function at fixed times, time-off function at fixed times, and so on.

The EPG information storage unit 330 stores the EPG information detected by the detection unit 315. The stored EPG information provides detailed information on a certain program selected on the EPG view through the user input unit 305.

The EPG function storage unit 335 stores information related to the EPG function set by a viewer. For example, if a viewer sets a program reservation function to tune and display a certain program at 8 p.m., the EPG function storage unit 335 stores the function of tuning and displaying the certain program at 8 p.m. Further, if a viewer sets the time-on function to turn on at 6 p.m., the EPG function storage unit 335 stores the function of turning on at 6 p.m.

The data storage unit 340 stores data such as video data, music data, and so on.

The second communication module 345 is connected, for communications, to the external device 200 through the Internet network 100. Thus, the second communication module 345 receives a web service address transmitted from the external device 200. The web service address is an address for performing a certain function set by the external device 200 and has the SOAP form.

The web service engine 350 checks whether a file contained in the web service address exists in a function list of a system directory. Further, if the file is checked to exist, the web service engine 350 outputs the web service address to the second SOAP engine 355. In an exemplary embodiment, the file contained in the web service address may have an extension of "asmx" such as "1.asmx".

The second SOAP engine 355 parses the web service address to generate XML indicating a certain function. Further, the second SOAP engine 355 outputs the generated XML to the web service engine 350.

The web service engine 350 analyzes the web language outputted from the second SOAP engine 355 to decide a function requested by the external device 200. That is, the web service engine 350 analyzes the web language to decide which function the function setting unit 360 is to set. Further, the web service engine 350 notifies the function setting unit 360 of the decided function.

The function setting unit 360 sets the function notified by the web service engine 350. For example, if the notified function is the time-on function of turning on at 8 p.m., the function setting unit 360 changes/sets the time-on function stored in the EPG function storage unit 335 into the notified function. Middleware can be used for such a function setting unit 360.

If a certain function requested by the external device 200 is set, the function setting unit 360 outputs, to the web service engine 350, a setting completion message indicating that the function has been set. The web service engine 350 outputs the setting completion message to the second SOAP engine 355 to generate the message in the SOAP form, and outputs to the second communication module 345 the setting completion message generated in the SOAP form. Thus, the setting completion message generated in the SOAP form is sent to the external device 200.

The control unit 365 controls the overall operations of the digital video/audio-processing apparatus 300 according to a control program and a signal applied from the user input unit 305 by the viewer's key input or selection.

In the present invention, the control unit 365 performs an EPG function set in the EPG function storage unit 335. For example, if a web service requested by the external device 200, that is, a certain function, is the time-on function of power-on at 8 a.m. and the requested function is set from the function setting unit 360 and stored in the EPG function storage unit 335, the control unit 365 turns on the system at 8 a.m.

Further, if the web service requested from the external device 200 is the program reservation function for a viewer to watch a program on channel 2 at 8 p.m. and the requested function is stored in the EPG function storage unit 335, the control unit 365 controls the tuner 310, video/audio-processing unit 320, and display unit 325 to tune and display the channel 2 at 8 p.m.

In the above exemplary embodiment of the present invention as above, a user has the external device 200 generate a web service address to control a function that the digital video/audio-processing apparatus 300 provides, and sends the web service address to the digital video/audio-processing apparatus 300 by using the SOAP, and the digital video/audio-processing apparatus 300 performs a certain function requested from the external device 200 under the control of the web service engine 350. That is, a user can control the operations of the digital video/audio-processing apparatus 300 by using the external device 200.

Figure 4:
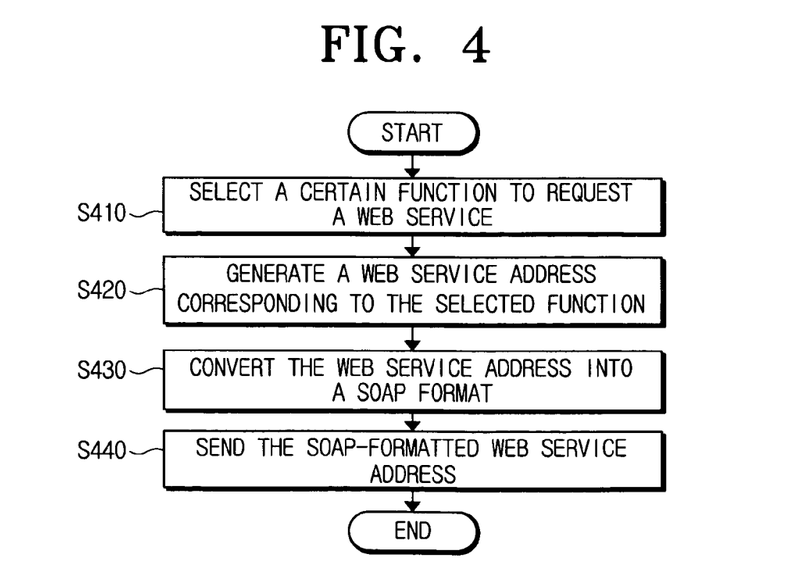
FIG. 4 is a flow chart for schematically explaining operations of an external device according to a remote control method using the web services for FIG. 1.

FIG. 4 is a flow chart for schematically explaining the operations of an external device according to a web service method for FIG. 1.

In FIG. 1 to FIG. 4, if the view generation unit 230 operates and a window for controlling the function of the digital video/audio-processing apparatus 300, for example, a web browser view, is displayed, the user input unit 210 selects a certain function to be controlled, and requests a web service (S410). Hereinafter, description will be made, for example, on the time-on function of power-on at 8 a.m., as a selected function, by using EPG information.

If the operation S410 is executed, the view generation unit 230 generates a web service address corresponding to the selected function (S420). Then the view generation unit 230 generates a web service address by using an IP of the digital video/audio-processing apparatus 300, a file related to the selected function, and an argument, for example, 8 a.m. and power-on, for carrying out the selected function.

If the operation S420 is executed, the first SOAP engine 260 generates, in the SOAP form, the web service address generated in the operation S420 (S430).

The first communication module 270 sends the generated web service address to the digital video/audio-processing apparatus 300 through the Internet network 100 (S440).

Figure 5:
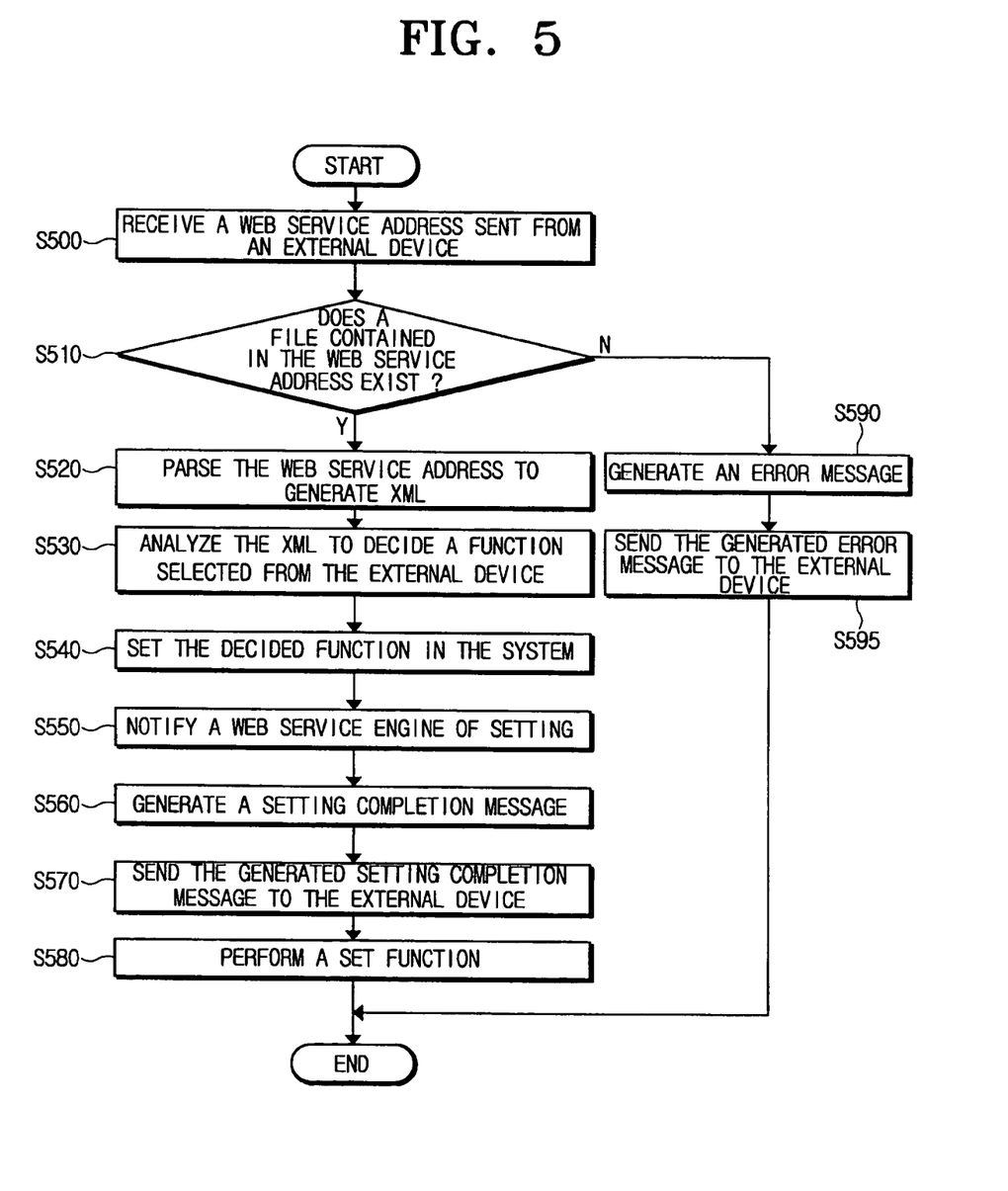
FIG. 5 is a flow chart for schematically explaining operations of the digital video/audio-processing apparatus according to a remote control method using the web services for FIG. 1.

FIG. 5 is a flow chart for schematically explaining the operations of the digital video/audio-processing apparatus 300, according to the web service method for FIG. 1.

In FIG. 1 to FIG. 5, the second communication module 345 receives a web service address received in the operation S440 and outputs the address to the web service engine 350 (S500).

The web service engine 350 checks whether a file included in the received web service address exists in a function list of a system directory (S510).

If the file is checked to exist in the function list in the operation S510, the second SOAP engine 355 parses the web service address received in the operation S500 to generate the XML temporarily formed in the web service address (S520).

If the operation S520 is executed, the web service engine 350 analyzes the generated XML to decide the function requested from the external device 200, and outputs the decided function to the function setting unit 360 (S530).

If the operation S530 is executed, the function setting unit 360 sets the decided function in the system, and notifies the web service engine 350 that the function is completely set (S540 and S550). That is, the function setting unit 360 overwrites the time-on function already stored in the EPG function storage unit 335 with the time-on function of power-on at 8 a.m. by using EPG information. Thus, the function selected from the external device 200 is set and stored in the EPG information storage unit 330.

In the operation S550, the web service engine 350 generates a setting completion message indicating that the function is completely set, and the second communication module 345 sends the generated setting completion message to the external device 200 (S560 and S570).

If a predetermined period of time lapses, the control unit 365 operates the digital video/audio-processing apparatus 300 to carry out the function set in the operation S540 (S580).

Meanwhile, if the file contained in the web service address is checked not to exist in the system directory in the operation S510, the web service engine 350 generates an error message, and the second communication module 345 sends the generated error message to the external device 200 (S590 and S595).

Figure 6:
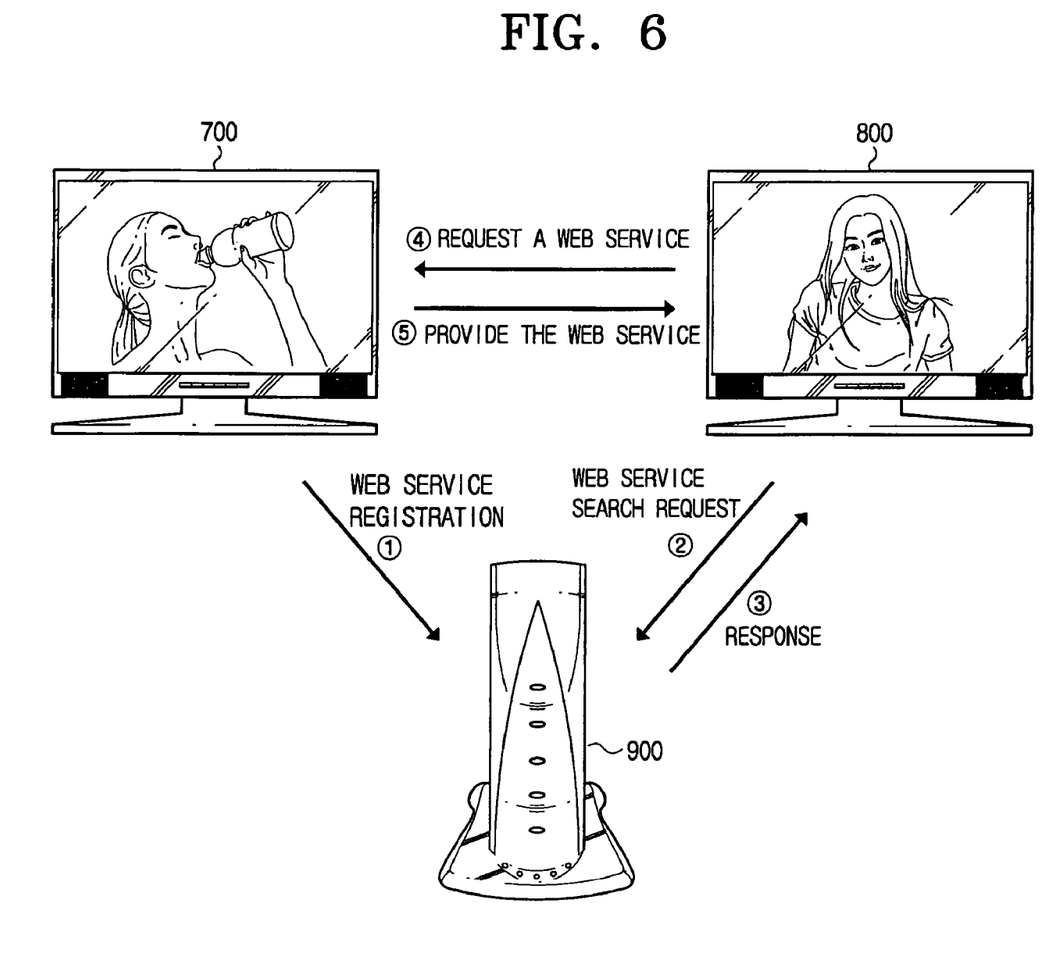
FIG. 6 is a view for showing a web service system according to another exemplary embodiment of the present invention.

FIG. 6 is a view for showing a web service system according to another exemplary embodiment of the present invention.

In FIG. 6, the digital video/audio-processing apparatus 700 is connected for communications to a web service requester 800 and a UDDI server 900 through the Internet network. The digital video/audio-processing apparatus 700 is a TV providing web services, and the web service requester 800 can be devices such as TVs, computers, and the like, that can request web services.

The digital video/audio-processing apparatus 700 provides certain web services. The digital video/audio-processing apparatus 700 requests the UDDI server 900 to register web services that it provides (1). Thus, the UDDI server 900 has a list of web services that the digital video/audio-processing apparatus 700 provides.

The web service requester 800 requests the UDDI server 900 to search for a certain web service by using the SOAP (2).

The UDDI server 900 checks whether the web service requested, to be searched for, is registered, and sends to the web service requester 800 the address of the digital video/audio-processing apparatus 700 providing the checked web service (3). Then, the UDDI server 900 sends the address of the digital video/audio-processing apparatus 700 in the SOAP form.

The web service requester 800 requests the digital video/audio-processing apparatus 700 for the web service, based on the received address of the digital video/audio-processing apparatus 700 (4), and the digital video/audio-processing apparatus 700 provides the web service requester 800 with the requested web service (5).

Figure 7:
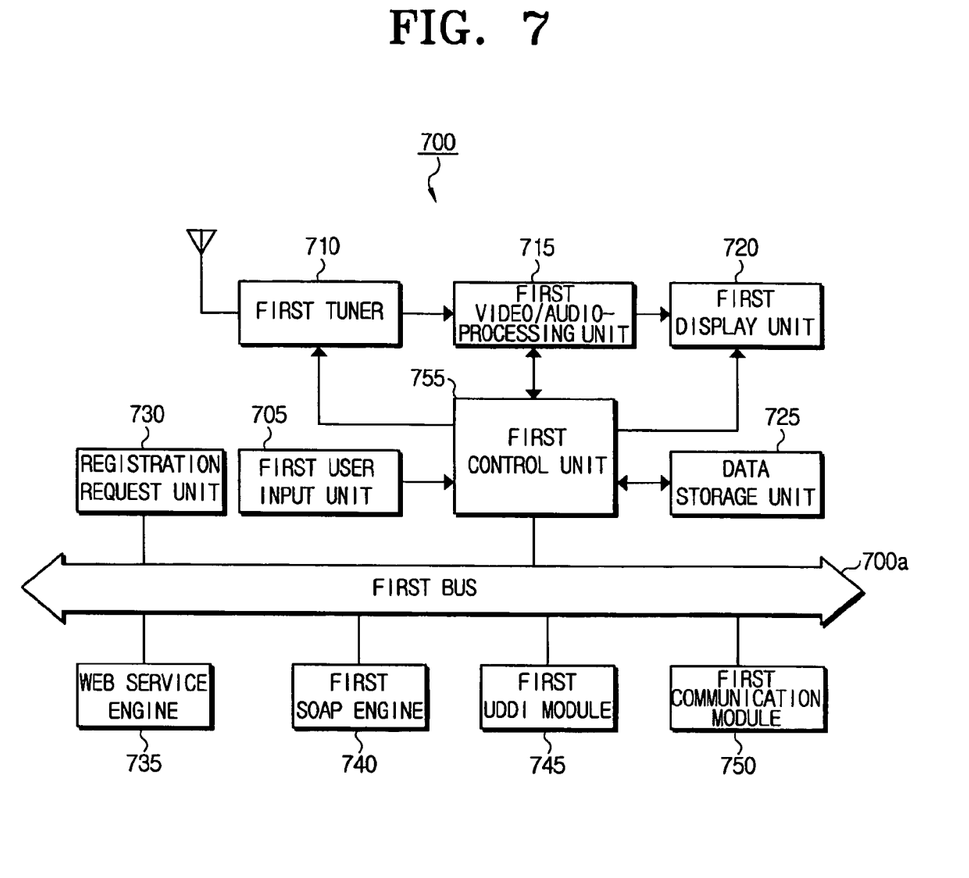
FIG. 7 is a block diagram for schematically showing the digital video/audio-processing apparatus of FIG. 6.

FIG. 7 is a block diagram for schematically showing the digital video/audio-processing apparatus 700 of FIG. 6.

In FIG. 6 and FIG. 7, the digital video/audio-processing apparatus 700 has a first user input unit 705, a first tuner 710, a first video/audio-processing unit 715, a first display unit 720, a data storage unit 725, a registration request unit 730, a web service engine 735, a first SOAP engine 740, a first UDDI module 745, a first communication module 750, and a first control unit 755. A first bus 700a provides paths for control signals and data transfers.

The first user input unit 705 has a plurality of function keys, and is a user interface generating, to the first control unit 755, commands for performing functions supported by the digital video/audio-processing apparatus 700, with the keys used.

The first tuner 710 tunes a channel set by a viewer out of a plurality of channels received through an antenna.

The first video/audio-processing unit 715 decodes a broadcast signal of the tuned channel to generate video and audio data that is displayable and audible. The generated video data is displayed on the first display unit 720, and the audio data is externally outputted through speakers (not shown).

The data storage unit 725 stores data, such as video data, music data, and so on, for providing web services.

If a user manipulates the first user input unit 705 and inputs a list of web services to be registered by using a view such as a web browser or an application program, the registration request unit 730 generates a registration request message to request the UDDI server 900 for web service registrations. The registration request message contains a list of web services that the digital video/audio-processing apparatus 700 provides and file information that the list is located.

The first SOAP engine 740 generates the registration request message in the form of SOAP, and outputs the generated registration request message to the first UDDI server 900. The UDDI server 900 is used to register and search for information on web services.

The first UDDI module 745 generates the registration request message of SOAP form in the UDDI standards by using the UDDI function. That is, the first UDDI module 745 changes a web service, to be provided, into a form that can be registered in the UDDI server 900.

The first communication module 750 sends to the UDDI server 900 the registration request message generated in the UDDI standards from the first UDDI module 745.

When a web service is requested from the web service requester 800, the digital video/audio-processing apparatus 700 operates as follows.

First, if the first communication module 750 receives a web service address from the web service requester 800, the first communication module 750 outputs the received web service address to the web service engine 735. The received web service address is an address generated according to the request of the web service requester 800, and has the SOAP form.

The web service engine 735 checks whether a file contained in the received web service address exists in a function list of a system directory. If the file exists, the web service engine 735 outputs the web service address to the first SOAP engine 740. In an exemplary embodiment, the file contained in the web service address may have an extension of 'asmx'.

The first SOAP engine 740 parses the web service address outputted from the web service engine 735, and generates and outputs XML to the web service engine 735.

The web service engine 735 analyzes the XML outputted from the first SOAP engine 740 and identifies a web service requested by the web service requester 800. Further, the web service engine 735 reads out of the data storage unit 725 data corresponding to the received web service address, and converts the data into the XML form.

Further, the first SOAP engine 740 converts, into the SOAP form, the data of XML form generated from the web service engine 735. The generated data of SOAP form is sent to the web service requester 800 through the web service engine 735 and the first communication module 750.

The first control unit 755 controls the overall operations of the digital video/audio-processing apparatus 700 according to a signal applied from the first user input unit 705 and a control program.

Figure 8:
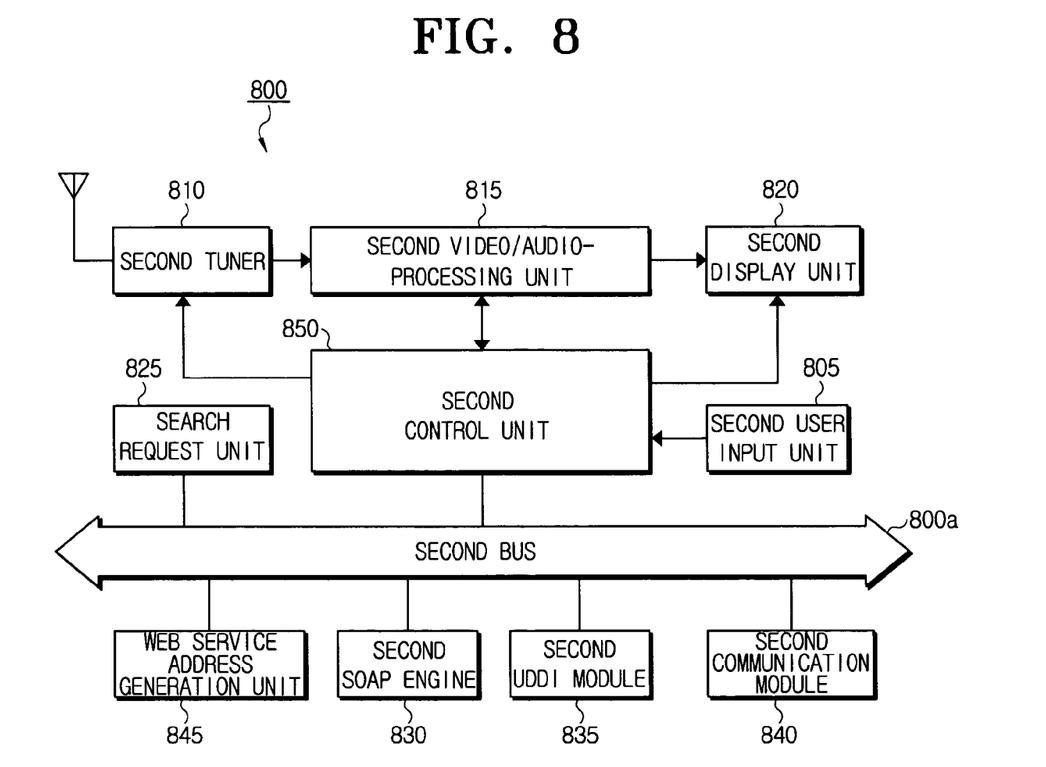
FIG. 8 is a block diagram for schematically showing the web service requester of FIG. 6.

FIG. 8 is a block diagram for schematically showing the web service requester 800 of FIG. 6.

In FIG. 6 to FIG. 8, the web service requester 800 has a second user input unit 805, a second tuner 810, a second video/audio-processing unit 815, a second display unit 820, a search request unit 825, a second SOAP engine 830, a second UDDI module 835, a second communication module 840, a web service address generation unit 845, and a second control unit 850. A second bus 800a provides paths for control signals and data transfers.

The second user input unit 805 is a user interface generating to the second control unit 850 commands for performing functions supported by the web service requester 800 through a plurality of function keys.

The second tuner 810 tunes to a channel selected by a viewer from a plurality of channels received through an antenna.

The second video/audio-processing unit 815 decodes a broadcast signal of the selected channel, and generates displayable video/audio data. The generated video data is displayed on the second display unit 820, and the generated audio data is externally outputted through speakers (not shown).

If a user manipulates the second user input unit 805, and inputs a desired web service by using an application program or a view such as view of a web browser, the search request unit 825 generates a search request message for requesting the UDDI server 900 to search for the desired web service.

The second SOAP engine 830 converts the generated search request message into the SOAP format.

The second UDDI module 835 converts the search request message of SOAP format into the UDDI standards. That is, the second UDDI module 835 converts a certain web service into a format that the UDDI server 900 can search for.

The second communication module 840 sends the search request message of UDDI standards to the UDDI server 900.

Further, the second communication module 840 receives an address of a web service provider providing a requested web service sent from the UDDI server 900. The address of the web service provider consists of an IP of the web service provider and file information, for example, "1.asmx", of a web service registered by the web service provider.

The web service address generation unit 845 generates a web service address by using a received address of a web service provider, that is, an address of the digital video/audio-processing apparatus 700 and a requested web service. For example, if the web service requester 800 requests video data, the web service address generation unit 845 generates a web service address by using an address of a web service provider and an argument of "requests video data", which is because a file of "1.asmx" provides video data as well as different data or functions provided by the digital video/audio-processing apparatus 700.

The second SOAP engine 830 converts into the SOAP format a web service address generated from the web service address generation unit 845.

The second communication module 840 sends the web service address of SOAP format to the digital video/audio-processing apparatus 700 to request a desired web service.

Accordingly, the digital video/audio-processing apparatus 700 performs the operations described with reference to FIG. 7 based on the web service address received from the web service requester 800. Thus, the web service of the digital video/audio-processing apparatus 700 is performed.

The second control unit 850 controls the overall operations of the web service requester 800 according to a control program and a signal applied from the second user input unit 805.

Figure 9:
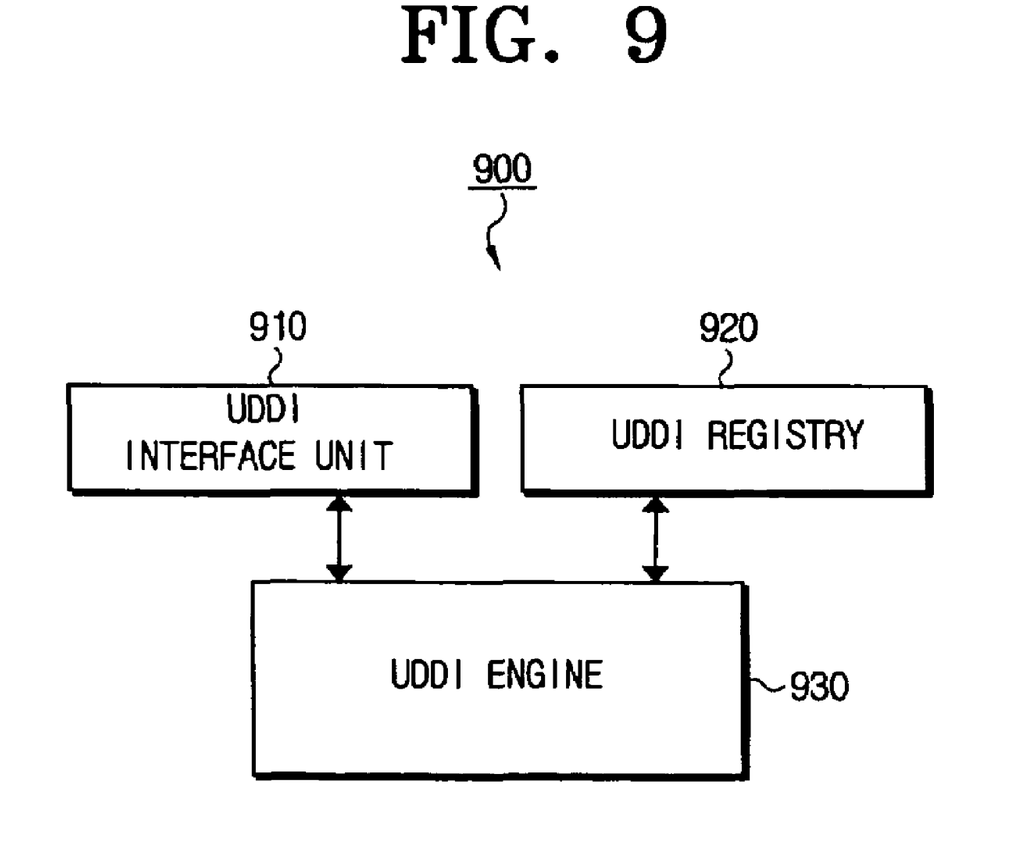
FIG. 9 is a block diagram for schematically showing the UDDI server of FIG. 6.

FIG. 9 is a block diagram for schematically showing the UDDI server of FIG. 6.

In FIG. 9, the UDDI server 900 includes a UDDI interface unit 910, a UDDI registry 920, and a UDDI engine 930.

The UDDI interface unit 910 receives, from the digital video/audio-processing apparatus 700, a registration request message of SOAP format having the UDDI standards. Further, the UDDI interface unit 910 receives from the web service requester 800 a search request message, of SOAP format, having the UDDI standards.

The UDDI registry 920 registers a list of web services that the digital video/audio-processing apparatus 700 provides, based on the received registration request message.

The UDDI engine 930 analyzes the received registration request message to register in the UDDI registry 920 a list of web services to be provided. Further, the UDDI engine 930 analyzes the received search request message to check whether a web service requested to be searched for is registered in the UDDI registry 920. Further, if registered, the UDDI engine 930 controls the UDDI interface unit 910 to send to a web service requester an address of the digital video/audio-processing apparatus 700 providing the web service requested to be searched for.

Figure 10:
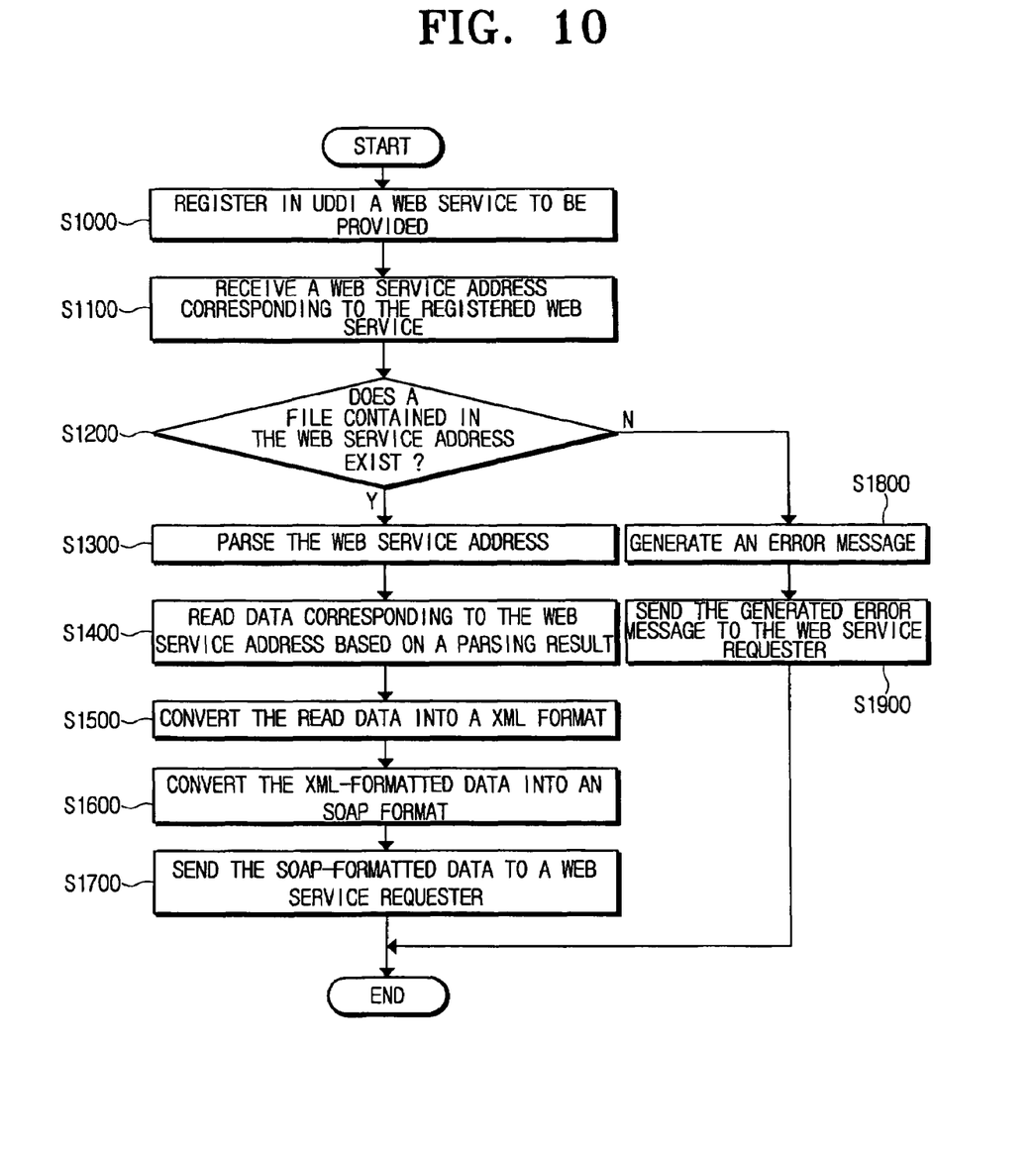
FIG. 10 is a flow chart for schematically explaining a web service method for the web service system of FIG. 6.

FIG. 10 is a flow chart for schematically explaining the web service method for the system of FIG. 6.

In FIG. 6 to FIG. 10, the digital video/audio-processing apparatus 700 registers in the UDDI server 900 the web services to be provided (S1000). In detail, in the operation S1000, the registration request unit 730 generates a registration request message requesting the web service registration, and the first SOAP engine 740 converts the registration request message into the SOAP format. Further, the first UDDI module 745 converts the registration request message of SOAP format into the UDDI standards, and the first communication module 750 sends to the UDDI server 900 the registration request message of the UDDI standards. Thus, the web service to be provided is registered in the UDDI server 900.

If the operation S1000 is completely performed and a web service address is received from the web service requester 800, the web service engine 735 checks whether a file contained in the received web service address exists in a function list of the system directory (S1100 and S1200).

If the file is checked to exist in the system directory in the operation S1200, the first SOAP engine 740 parses the web service address to generate the XML temporarily formed in the web service address (S1300).

If the operation S1300 is executed, the web service engine 735 analyzes the XML resulting from the parsing, and reads out of the data storage unit 725 the data corresponding to the web service address (S1400).

Further, the web service engine 735 converts the read data into the XML format (S1500).

If the operation S1500 is executed, the first SOAP engine 740 converts the XML-formatted data into the SOAP formatted data, and the first communication module 750 sends the SOAP-formatted data to the web service requester 800 (S1600 and S1700).

Accordingly, the web service requester 800 receives the requested web service. For example, if the web service requester 800 requests video data, the digital video/audio-processing apparatus 700 sends to the web service requester 800 the video data stored in the data storage unit 725. Further, the web service requester 800 stores or displays on the first display unit 720 the video data provided from the digital video/audio-processing apparatus 700.

Meanwhile, if a file contained in the web service address does not exist in a function list of the system directory in the operation S1200, the web service engine 735 generates an error message, and the first communication module 750 sends the generated error message to the web service requester 800 (S1800 and S1900).

As described so far, with the web service-enabled digital video/audio-processing apparatus, and web service method and system therefor according to the present invention, a user can connect to a TV installed at home, and change and/or carry out the functions of the TV even when the user is out of home, which is because the video/audio-processing apparatus such as a TV provides web service functions.

Further, since the present invention enables an external device such as a host computer to display an EPG view set in the digital video/audio-processing apparatus by using web services, a user can more freely control the digital video/audio-processing apparatus.

Further, the present invention enables video data, music data, and the like to be shared between a digital video/audio-processing apparatus and a computer and between the digital video/audio-processing apparatuses.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A web service-enabling digital video/audio-processing apparatus, comprising:
   a first communication module which receives a web service address from an external device to perform a function;
   a web service engine which checks whether a file contained in the web service address exists in a function list, and outputs the web service address if the file exists;
   a first engine unit which parses the web service address output by the web service engine and generates a web language corresponding to the function;
   a function setting unit which sets the function based on the web language; and
   a control unit which performs the set function.

2. The apparatus as claimed in claim 1, wherein the web service engine analyzes the web language and determines the function that the function setting unit is to set, and notifies the function setting unit of the function which is determined, and the function setting unit sets the function.

3. The apparatus as claimed in claim 1, wherein the function is at least one of a program reservation, a program reservation cancellation, a time-on function of power-on at a fixed time, and a time-off function of power-off at a fixed time.

4. The apparatus as claimed in claim 3, wherein the control unit performs the function by using Electronic Program Guide information.

5. The apparatus as claimed in claim 3, wherein, if the function determined by the web service engine is to be re-set, the function setting unit re-sets the function, and the control unit performs the function which is re-set.

6. The apparatus as claimed in claim 1, wherein the external device comprises:
   a web service requester which generates a view enabling a user to select the function, and generates the web service address corresponding to the function to request a web service;
   a display unit which displays the view;
   a user input unit which selects the function from the view;
   a second engine unit which generates, in a predetermined protocol format, the web service address corresponding to the function, if the web service is requested; and
   a second communication module which sends the web service address to the first communication module.

7. The apparatus as claimed in claim 6, wherein the predetermined protocol is a Simple Object Access Protocol (SOAP), and the first and second engine units are SOAP engines, and the web language generated from the first engine unit is eXtensible Markup Language (XML).

8. The apparatus as claimed in claim 7, further comprising a storage unit which stores data, wherein, if the function determined by the web service engine is determined for sending data stored in the storage unit, the function setting unit reads the data stored in the storage unit and outputs the data to the web service engine, and the web service engine generates the XML data containing the data which is output, the first SOAP engine converts the generated XML data into the SOAP format, and the first communication module sends the data in the SOAP format to the external device.

9. The apparatus as claimed in claim 1, wherein if the file is determined not to exist, the web service engine generates and sends an error message to the external device through the communication module.

10. A web service method, comprising:
    receiving a web service address from an external device to perform a function;
    checking, via a web service engine, whether a file contained in the web service address exists in a function list;
    if the file exists, parsing the web service address and generating a web language corresponding to the function;
    analyzing the web language to determine the function; and
    setting and performing the function.

11. The method as claimed in claim 10, wherein the function is at least one of a program reservation, a program reservation cancellation, a time-on function of power-on at a fixed time, and a time-off function of power-off at a fixed time.

12. The method as claimed in claim 11, wherein the function is performed by using Electronic Program Guide information.

13. The method as claimed in claim 10, before the operation of receiving the web service address, further comprising:
displaying a view for selecting the function;
selecting the function on the generated view to request a web service;
converting into a predetermined protocol format the web service address corresponding to the function; and
sending by the external device the web service address.

14. The method as claimed in claim 13, wherein the predetermined protocol is a Simple Object Access Protocol (SOAP), the converting into the predetermined protocol format is executed by a SOAP engine, and the web language is eXtensible Markup Language (XML).

15. The method as claimed in claim 14, further comprising sending to the external device the data corresponding to the web service address by using the SOAP if the decided certain function is a request for sending stored data.

16. The method as claimed in claim 10, wherein, if it is determined that the file does not exist, the web service engine generates and sends an error message to the external device.

17. A web service-enabling digital video/audio-processing apparatus, comprising:
a storage unit which stores data for providing a web service;
a registration request unit which generates a registration request message for registering a list of web services in a Universal Discovery Description and Integration (UDDI) server;
a first SOAP engine which converts the registration request message into a Simple Object Access Protocol (SOAP) format, and parses a web service address received from the web service requester;
a first UDDI module which converts the registration request message in the SOAP format into UDDI standards;
a first communication module which sends the registration request message converted into UDDI to the UDDI server, and receives the web service address from the web service requester; and
a first web service engine which reads data from storage unit data corresponding to the web service address, and converts the data into an extensible Markup Language (XML) format, based on a result obtained from parsing the web service address, wherein the first SOAP engine converts the data in the XML format into the SOAP format, and the first communication module sends the data in the SOAP format to the web service requester.

18. The apparatus as claimed in claim 17, wherein the web service requester comprises:
a search request unit which generates a search request message for requesting the UDDI server to search for the web service;
a second SOAP engine which converts the search request message into the SOAP format;
a second UDDI module which converts the search request message in the SOAP format into the UDDI standards;
a second communication module which sends the registration request message converted into the UDDI standards to the UDDI server, and receives an address of a web service provider from the UDDI server; and
a web service request unit which generates the web service address and requests the web service based on the address of the web service provider,
wherein the second SOAP engine converts the web service address into the SOAP format, and the second communication module sends the web service address in the SOAP format to the web service provider to request the web service.

19. The apparatus as claimed in claim 17, wherein the UDDI server comprises:
a UDDI interface unit which receives a SOAP-formatted registration request message of UDDI standards and a SOAP-formatted search request message of UDDI standards;
a UDDI registry which registers the web service based on the SOAP-formatted registration request message; and
a UDDI engine which analyzes the registration request message to register the web service in the UDDI registry, analyzes the search request message to check whether the web service is registered, and sends to the web service requester the address of the web service provider providing the web service, if the web service is registered.

20. The apparatus as claimed in claim 17, wherein the web service requester is one of a personal computer and a digital broadcast processing device.

21. A web service method for receiving a broadcast signal, comprising:
registering, in a Universal Discovery Description and Integration (UDDI) server, a web service to be provided;
receiving from a web service requester a web service address corresponding to the web service registered in the UDDI server;
checking, by a web service engine, whether a file contained in the web service address exists in a function list;
parsing the web service address if the file exists;
reading data corresponding to the web service address and converting the data into an eXtensible Markup Language (XML) format based on a parsing result; and
converting the data in the XML format into a Simple Object Access Protocol (SOAP) format and sending the data in the SOAP format to the web service requester.

22. The method as claimed in claim 21, wherein the registration operation comprises:
generating a registration request message for registering the web service in the UDDI server;
converting the registration request message into the SOAP format;
converting the registration request message in the SOAP format into UDDI standards that the UDDI server can recognize; and
sending the registration request message converted into UDDI standards to the UDDI server.

* * * * *